US011994812B2

(12) United States Patent
Yoshida et al.

(10) Patent No.: US 11,994,812 B2
(45) Date of Patent: May 28, 2024

(54) IMAGE FORMING APPARATUS

(71) Applicant: CANON KABUSHIKI KAISHA, Tokyo (JP)

(72) Inventors: Nobuyoshi Yoshida, Shizuoka (JP); Naoki Fukushima, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/123,443

(22) Filed: Mar. 20, 2023

(65) Prior Publication Data

US 2023/0229096 A1 Jul. 20, 2023

Related U.S. Application Data

(63) Continuation of application No. PCT/JP2021/029669, filed on Aug. 11, 2021.

(30) Foreign Application Priority Data

Sep. 25, 2020 (JP) ................................ 2020-161138

(51) Int. Cl.
*G03G 15/00* (2006.01)
*G03G 15/01* (2006.01)
(Continued)

(52) U.S. Cl.
CPC ..... *G03G 15/0105* (2013.01); *G03G 21/1619* (2013.01); *G03G 21/1652* (2013.01);
(Continued)

(58) Field of Classification Search
CPC ........... G03G 15/0105; G03G 21/1619; G03G 21/1652; G03G 21/1803
(Continued)

(56) References Cited

U.S. PATENT DOCUMENTS 11,513,449 B2 11/2022 Fukushima et al.

FOREIGN PATENT DOCUMENTS

CN 100399199 * 7/2008
JP 2000-098707 A 4/2000
(Continued)

OTHER PUBLICATIONS

PCT International Search Report dated Sep. 21, 2021, in related PCT Application No. PCT/JP2021/029669.

*Primary Examiner* — Hoan H Tran
(74) *Attorney, Agent, or Firm* — VENABLE LLP

(57) ABSTRACT

An image forming apparatus that is capable of executing image forming operation includes an image bearing member, a developer carrying member that faces the image bearing member in a state of keeping a predetermined gap therefrom and develops a latent image on the image bearing member using developer, a frame that supports the developer carrying member, and applying unit that apply developing voltage, in which DC voltage and AC voltage are superimposed, to the developer carrying member. A conductive member is disposed in the frame, a detecting unit detects AC current induced in the conductive member by applying the developing voltage to the developer carrying member, and a control portion controls the applying unit. The control portion controls the developing voltage in the image forming operation, based on the AC current which the detecting unit detects in a case where the voltage is applied by the applying unit.

14 Claims, 9 Drawing Sheets

(51) Int. Cl.
*G03G 21/16* (2006.01)
*G03G 21/18* (2006.01)

(52) U.S. Cl.
CPC .................. *G03G 21/1803* (2013.01); *G03G 2215/00632* (2013.01)

(58) Field of Classification Search
USPC .............................. 399/46, 53, 55, 119, 120
See application file for complete search history.

(56) References Cited

FOREIGN PATENT DOCUMENTS

| | | | |
|---|---|---|---|
| JP | 2004-093699 A | | 3/2004 |
| JP | 2005017935 | * | 1/2005 |
| JP | 2005031385 | * | 2/2005 |
| JP | 2015-225264 A | | 12/2015 |

* cited by examiner

IMAGE FORMING APPARATUS

CROSS-REFERENCE TO RELATED APPLICATIONS

This application is a Continuation of International Patent Application No. PCT/JP2021/029669, filed Aug. 11, 2021, which claims the benefit of Japanese Patent Applications No. 2020-161138, filed Sep. 25, 2020, which are hereby incorporated by reference herein in their entirety.

BACKGROUND OF THE INVENTION

Field of the Invention

The present invention relates to an image forming apparatus that forms an image on a recording material using an electrophotographic system.

Background Art

In an image forming apparatus (e.g. printer) using an electrophotographic image forming system (electrophotographic process), a non-contact developing system, which performs development in a state where an image bearing member and a developer carrying member have a gap therebetween, is used as a developing system to develop an electrostatic image into a toner image using developer (also called toner). If this system is used, load applied to the toner can be reduced, hence stable images can be obtained throughout the life span of the image forming apparatus. In the case of a developing apparatus based on such a non-contact developing system, the above mentioned gap may be changed due to the driving of the developer carrying member and the image bearing member, and thereby the field intensity between the developer carrying member and the image bearing member may be changed. This causes such a problem as image density non-uniformity generated on the image to be formed. A conventional method for reducing the generation of the image density non-uniformity is increasing a peak-to-peak value of AC voltage in the developing bias voltage applied between the developer carrying member and the image bearing member, so that the developer is sufficiently scattered between the developer carrying member and the image bearing member. However, if this peak-to-peak value is increased, the potential difference between the surface potential of the image bearing member and the peak value of the developing voltage increases, which may generate a high voltage leak between the developer carrying member and the image bearing member, and noise may be generated on an image to be formed.

The peak-to-peak value of the AC voltage at which a high voltage leak is generated changes depending on the gap value, the atmospheric pressure, and the like of the developing region, and therefore changes depending on the individual image forming apparatus and the operation environment. Hence in the case of a prior art, the leak is generated between the image bearing member and the developer carrying member while changing the peak-to-peak value of the AC voltage between the developer carrying member and the image bearing member, toner which adhered to the image bearing member by the leak is detected by a density sensor, and it is determined whether or not a leak is generated based on this detection (PTL 1).

In the case of the above prior art, however, the density sensor is expensive, and a leak cannot be detected if the leak is generated in an area where the density sensor is not available.

It is an object of the present invention to provide means for detecting a leak between the image bearing member and the developer carrying member using an inexpensive and simple configuration.

CITATION LIST

Patent Literature

PTL 1 Japanese Patent Application Publication No. 2000-098707

SUMMARY OF THE INVENTION

In order to solve the above problem, the image forming apparatus of the present invention is an image forming apparatus that is capable of executing an image forming operation, including: an image bearing member; a developer carrying member that faces the image bearing member in a state of keeping a predetermined gap therefrom, and develops a latent image formed on the image bearing member using developer; a frame that supports the developer carrying member; an applying unit that applies developing voltage, in which DC voltage and AC voltage are superimposed, to the developer carrying member;

a conductive member that is disposed in the frame; a detecting unit that detects AC current induced in the conductive member by the applying unit applying the developing voltage to the developer carrying member; and a control portion that controls the applying unit. The control portion controls the developing voltage in the image forming operation, based on the AC current which the detecting unit detects in a case where the developing voltage is applied by the applying unit.

Further features of the present invention will become apparent from the following description of exemplary embodiments with reference to the attached drawings.

DESCRIPTION OF THE EMBODIMENTS

Embodiments of the present invention will now be described in detail based on examples with reference to the drawings. The dimensions, materials, shapes and the like of the components and relative positions thereof described in the embodiments should be appropriately changed according to the configuration and various conditions of the apparatus to which the present invention is applied. In other words, the scope of the present invention is not limited to the following embodiments.

Example 1

Example 1 of the present invention will be described with reference to FIG. 1 to FIG. 4.

<Description of Image Forming Apparatus>

Figure 2:
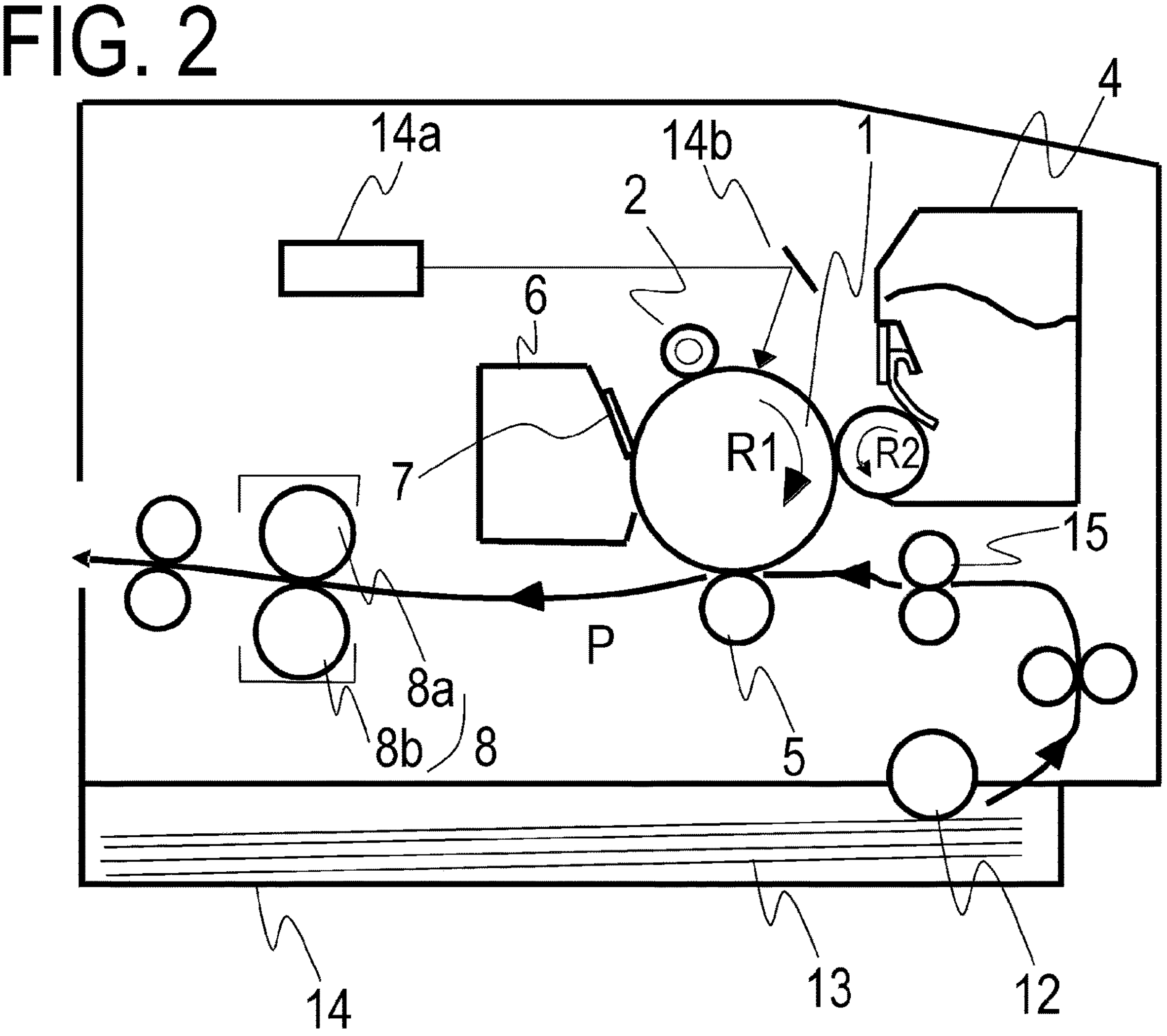
FIG. 2 is a schematic cross-sectional view depicting a configuration of an embodiment of an image forming apparatus according to the present invention.

FIG. 2 indicates an example of an image forming apparatus that includes a developing apparatus 4, and can execute an image forming operation. FIG. 2 is a longitudinal cross-sectional view depicting a general configuration of the image forming apparatus. The image forming apparatus in FIG. 2 includes an image forming apparatus main body (hereafter simply called "apparatus main body"), which functions as a printer engine.

The apparatus main body encloses an electrophotographic photosensitive member (hereafter called "photosensitive drum") 1, which is a drum-shaped image bearing member. When a driving force is transferred, the photosensitive drum 1 is rotary-driven around an axis at a predetermined processing speed (peripheral speed) in the arrow R1 direction indicated in FIG. 2. In Example 1, the photosensitive drum 1, which plays the center role of the image forming process, is an organic photosensitive drum 1 where an undercoating layer, a carrier generation layer and a carrier moving layer (functional films) are sequentially coated on the outer peripheral surface of a 30 mm diameter aluminum cylinder. The surface of the photosensitive drum 1 is charged by a charging roller 2, which is a charging apparatus (charging means, charging member). The charging roller 2 is disposed in contact with the surface of the photosensitive drum 1, and is rotated by the rotation of the photosensitive drum 1 in the arrow R1 direction. Charging voltage (e.g. DC voltage) is applied to the charging roller 2 by a charging voltage applying power supply (not illustrated), for example. Thereby the surface of the photosensitive drum 1 is uniformly charged to a predetermined polarity and a predetermined potential.

An electrostatic latent image is formed on the surface of the photosensitive drum 1 after charging by an exposure apparatus. The exposure apparatus includes a laser scanner 14*a*, a polygon mirror (not illustrated), a reflection lens 14*b*, and the like. The exposure apparatus irradiates the surface of the photosensitive drum 1 with a laser beam based on the image information, so as to remove electric charges in the irradiated portion, and forms an electrostatic latent image thereby. The developing apparatus 4 causes toner to adhere to the electrostatic latent image formed on the surface of the photosensitive drum 1 in this way, whereby the electrostatic latent image is developed as a toner image. The developing apparatus 4 will be described in detail later.

The toner image formed on the surface of the photosensitive drum 1 is transferred to a transfer material 13 by a transfer roller 5 (transfer apparatus). This transfer material 13 is stored in a paper feeding cassette 14, and is supplied in the arrow P direction by a paper feeding roller 12, a resist roller 15, and the like, to a transfer nip portion, synchronizing with the toner image on the photosensitive drum 1. By the transfer roller 5 driven by a transfer voltage applying power supply (not illustrated), the toner image on the photosensitive drum 1 is transferred to the transfer material 13. Toner remaining on the surface, after the toner image is transferred to the transfer material 13, is removed by a cleaning blade 7 of a cleaning apparatus 6, then the photosensitive drum 1 is used for the next image formation.

Figure 1:
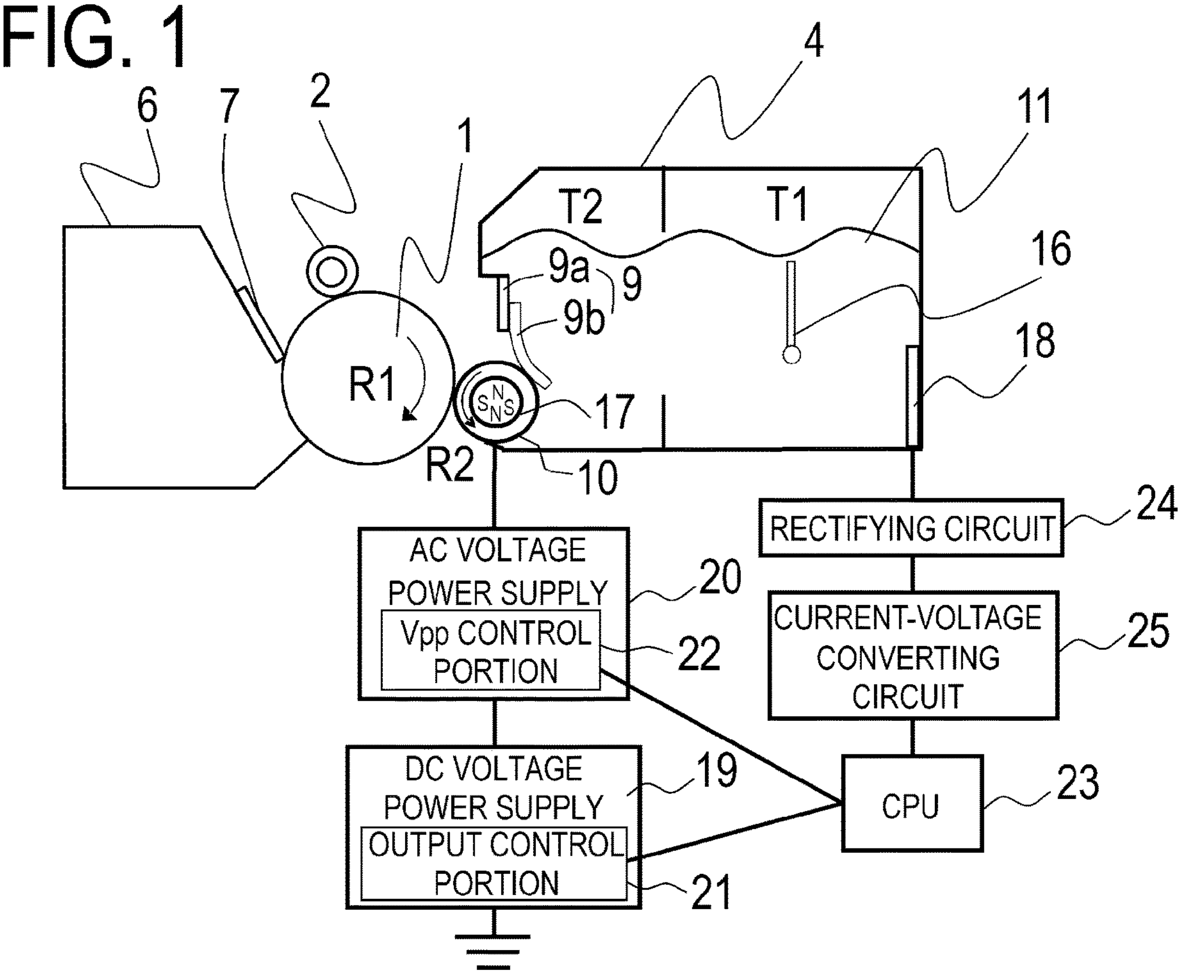
FIG. 1 is a schematic diagram of an embodiment of a developing apparatus and a process cartridge according to the present invention.

The transfer material 13, after the toner image is transferred, is transported to a fixing apparatus 8, and the toner image on the surface of the transfer material 13 is fixed by heat and pressure received from a fixing roller 8*a* and a pressure roller 8*b*. The transfer material 13 on which the toner image is fixed is discharged out of the apparatus main body, whereby image formation completes. As illustrated in FIG. 1, out of the above members that perform the image forming process, the cleaning apparatus 6, including the photosensitive drum 1 and the charging roller 2, and the developing apparatus 4, are integrated as a process cartridge, and can be integrally attached to/detached from the image forming apparatus main body.

The developing apparatus 4 of Example 1 will be described in detail next with reference to FIG. 1. FIG. 1 is a longitudinal cross-sectional view depicting a general configuration of the developing apparatus. The developing apparatus 4 is a developing apparatus that uses magnetic single-component toner, and is a frame that includes a toner container, which is divided into a toner storage chamber T1 to store toner 11, and a developing chamber T2 including a developing sleeve 10 and a developing blade 9, and the toner storage chamber T1 and the developing chamber T2 are connected via an opening. Generally a stirring member 16, that stirs and conveys the toner 11, is disposed in the toner storage chamber T1, and the developing chamber T2 includes the developing sleeve 10 that bears and carries conveyed toner 11, and the developing blade 9 that regulates the thickness of the toner layer carried on the developing sleeve 10.

The developing sleeve 10 is a non-magnetic sleeve which is pipe formed of aluminum or stainless steel, and is supported by the toner container, so as to be rotatable in the arrow R2 direction. In Example 1, a 14 mm diameter aluminum hollow cylindrical pipe is used. Rollers (not illustrated) are fixed to both ends of the developing sleeve 10 in the longitudinal direction (axial direction). The developing sleeve 10 maintains a predetermined gap (space) from the surface of the photosensitive drum by contacting the outer peripheral surfaces of the rollers with the photosensitive drum 1 which is facing the rollers. In Example 1, the thickness of each roller is adjusted so that the developing sleeve 10 and the surface of the photosensitive drum 1 face each other, maintaining a 300 μm gap.

The surface of the developing sleeve 10 is coated with a solvent of a phenol resin in which carbon, a charge control agent and particles to roughen the surface are dispersed, so that the proper charges can be provided when a desired amount of toner is carried. Because of this coating, the surface of the developing sleeve 10 has roughness, and in Example 1, the arithmetic average roughness is Ra=1.2 μm. A magnet 17 is disposed inside the developing sleeve 10. The magnet 17 is formed in a cylindrical shape, where a plurality of N poles and S poles are formed alternately in the peripheral direction. The magnet 17 is fixed inside the developing sleeve 10, while the developing sleeve 10 rotates in the arrow R2 direction.

The developing blade 9 is constituted of a support member 9*a* and an elastic blade 9*b*, such that the elastic blade 9*b* contacts the surface of the developing sleeve 10. The elastic blade 9*b* is a urethane rubber formed in a plate shape, for example, of which a base end is fixed to the support member 9*a*, and a front end is contacted to the surface of the developing sleeve 10 at a predetermined pressure, so as to be elastically deformable. The elastic blade 9*b* is for regulating the layer thickness of the toner 11 attracted to the surface of the developing sleeve 10 by the magnetic force of the above mentioned magnet 17. The toner carried on the surface of the developing sleeve 10 receives tribo-electric charging among toner which is carried by rotation of the developing sleeve 10 in the arrow R2 direction, and tribo-electric charging by rubbing between the developing sleeve 10 and the elastic blade 9*b* when the layer thickness is regulated by the developing blade 9. Thereby the toner carried on the surface of the developing sleeve 10 is conveyed from the surface of the developing sleeve 10 to the developing region that faces the surface of the photosensitive drum 1 while receiving appropriate charges. Here a DC voltage power supply 19 and an AC voltage power supply 20 are connected with the developing sleeve 10, as illustrated in FIG. 1, and the developing voltage, in which DC and AC are superimposed, is applied via a sliding contact. Thereby the toner on the developing sleeve 10 is scattered to the photosensitive drum 1, and electrostatically adheres to the electrostatic latent image in the developing region, whereby the electrostatic latent image is developed as the toner image.

The DC voltage power supply 19 is the applying unit, that is a circuit to generate DC components to be applied to the developing sleeve 10, and the output of the DC voltage power supply 19 is inputted to the AC voltage power supply 20. The DC voltage power supply 19 includes an output control portion 21, and the output control portion 21 controls the value of the voltage, which is outputted by the DC voltage power supply 19, according to the instruction of the CPU 23. The AC voltage power supply 20 is the applying unit that is a circuit to output AC voltage, of which average value (area center value) is the DC voltage outputted by the DC voltage power supply 19, with rectangular waves (pulsed) at a frequency of f=2.5 kHz and duty of 50%, for example. The AC voltage power supply 20 includes a peak-to-peak value (hereafter Vpp) control portion 22. The Vpp control portion 22 controls the peak-to-peak voltage of the AC voltage according to the instruction by the CPU 23.

In Example 1, the CPU 23 is a control portion that controls the operation of the image forming apparatus in general, and has a configuration that corresponds to the acquiring unit and the sensing unit of the present invention.

<Leak Detection Between the Photosensitive Drum and Developing Sleeve>

A leak detecting mechanism between the photosensitive drum 1 and the developing sleeve 10 will be described next. In Example 1, a metal plate 18, which is a conductive detecting member (conductive member), is disposed in the toner chamber T1, as illustrated in FIG. 1. A contact configuration is disposed between the image forming apparatus main body and the process cartridge in order to electrically connect therebetween. In other words, the process cartridge includes a cartridge side first contact and a cartridge side second contact, and the image forming apparatus main body includes a main body side first contact and a main body side second contact. The developing sleeve 10 is electrically connected with the cartridge side first contact, and the metal plate 18 is connected with the cartridge side second contact via conductive wires or the like respectively. In a state where the process cartridge is attached to the image forming apparatus main body, the cartridge side first contact and the cartridge side second contact are electrically contacting with the main body side first contact and the main body side second contact of the printer main body respectively. Bias voltage, including the AC components, is applied to the main body side first contact from the power supply disposed inside the printer main body. When bias voltage, including the AC components, is applied to the developing sleeve 10 from the power supply, electric current in accordance with the applied voltage is induced in the metal plate 18. By detecting this current, the leak state between the photosensitive drum 1 and the developing sleeve 10 is detected.

A current detecting circuit, which is the detecting unit, will be described in detail next with reference to FIG. 1. In the current detecting circuit, a rectifying circuit 24 that rectifies current induced in the metal plate electrode, and a current-voltage converting circuit 25 that converts a current signal generated in the rectifying circuit 24 into the voltage Vdc, are disposed. The rectifying circuit 24 is electrically conductive with the main body side second contact. The current-voltage converting circuit 25 is connected to the CPU 23, and compares the relationship with the peak-to-peak voltage of the AC voltage. In Example 1, the current signal, generated in the rectifying circuit 24, is converted into voltage, but the present invention is not limited thereto.

Figure 3:
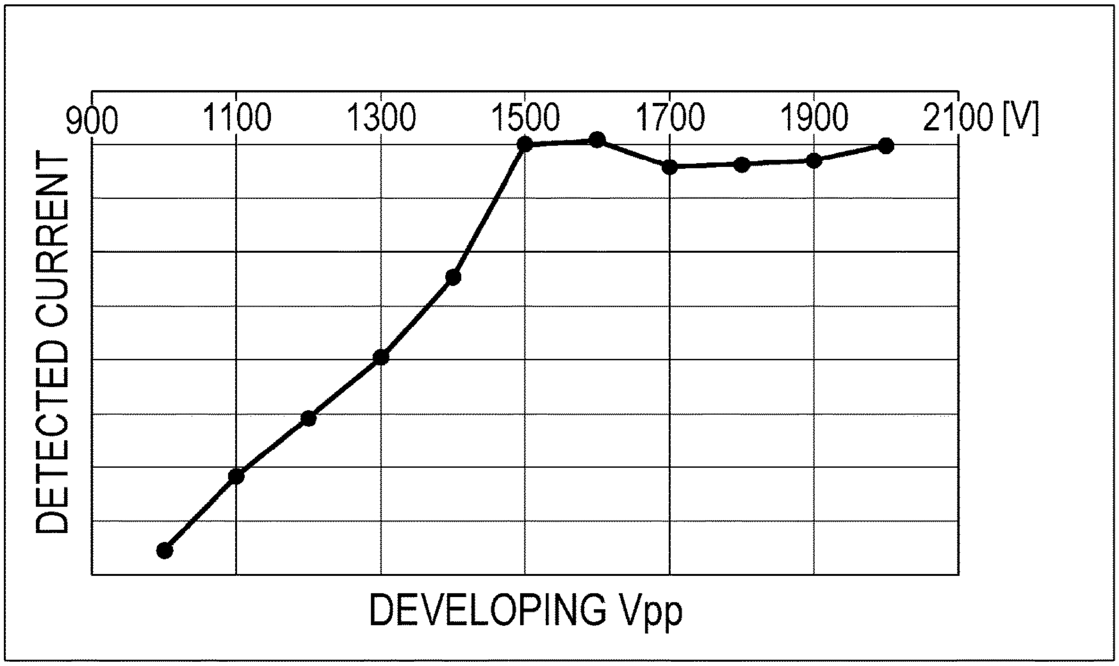
FIG. 3 is a relationship diagram between Vpp of the AC voltage applied to a developing sleeve and a current value induced in an electrode.

FIG. 3 indicates the relationship between the Vpp of the AC voltage applied from the power supply to the developing sleeve 10, and the current value detected by the rectifying circuit 24 this time, according to Example 1. As indicated here, as the Vpp of the AC voltage is increased, the current increases in proportion thereto, but the detected current hardly changes once the Vpp of the AC voltage exceeds a certain value. Further, according to the images printed in this test, an image defect, caused by a developing leak, is observed at the timing when the change of the detected current becomes small.

This is probably because the AC voltage was unable to maintain normal voltage waveforms due to the leak generated between the photosensitive drum and the developing sleeve, which was caused by an increase of the Vpp of the AC voltage. In other words, once the AC voltage can no longer maintain normal voltage waveforms, the developing waveform no longer changes even if the Vpp is further increased. Hence the current induced in the metal plate inside the toner chamber stops changing. In other words, once the developing leak is generated, when a certain Vpp is applied (Vpp=1500V in the case of FIG. 3), voltage exceeding this voltage is no longer effectively applied to the developing roller. Since the potential difference itself between the developing roller and the metal plate inside the toner chamber is unchanged after the developing leak, even if the Vpp is increased, the current induced in the metal plate inside the toner chamber is saturated at the Vpp at the timing when the developing leak was generated. In other words, the current, that should not flow, flows to the photosensitive drum side as leak current, and prevents an increase of the current that should be induced in the metal plate inside the toner chamber. Based on this phenomena, the developing leak can be detected by using the metal plate inside the toner chamber at the Vpp where the developing leak was generated.

In this case, the detection accuracy increases if the internal impedance of the circuit is high with respect to the output of the AC voltage power supply 20. A high voltage power supply, that outputs a high voltage, can better reduce the developing leak, since the upper limit of applicable voltage is high. However once the leak occurs, there is the risk that a large current may flow. Furthermore, the high voltage power supply, which can output high voltage, has high cost, and takes up a large substrate area. Therefore in Example 1, a configuration that decreases cost and size by keeping the voltage output high enough to implement good image formation, and that is sensitive to resistance changes in the case of the occurrence of a developing leak, is used.

Figure 4:
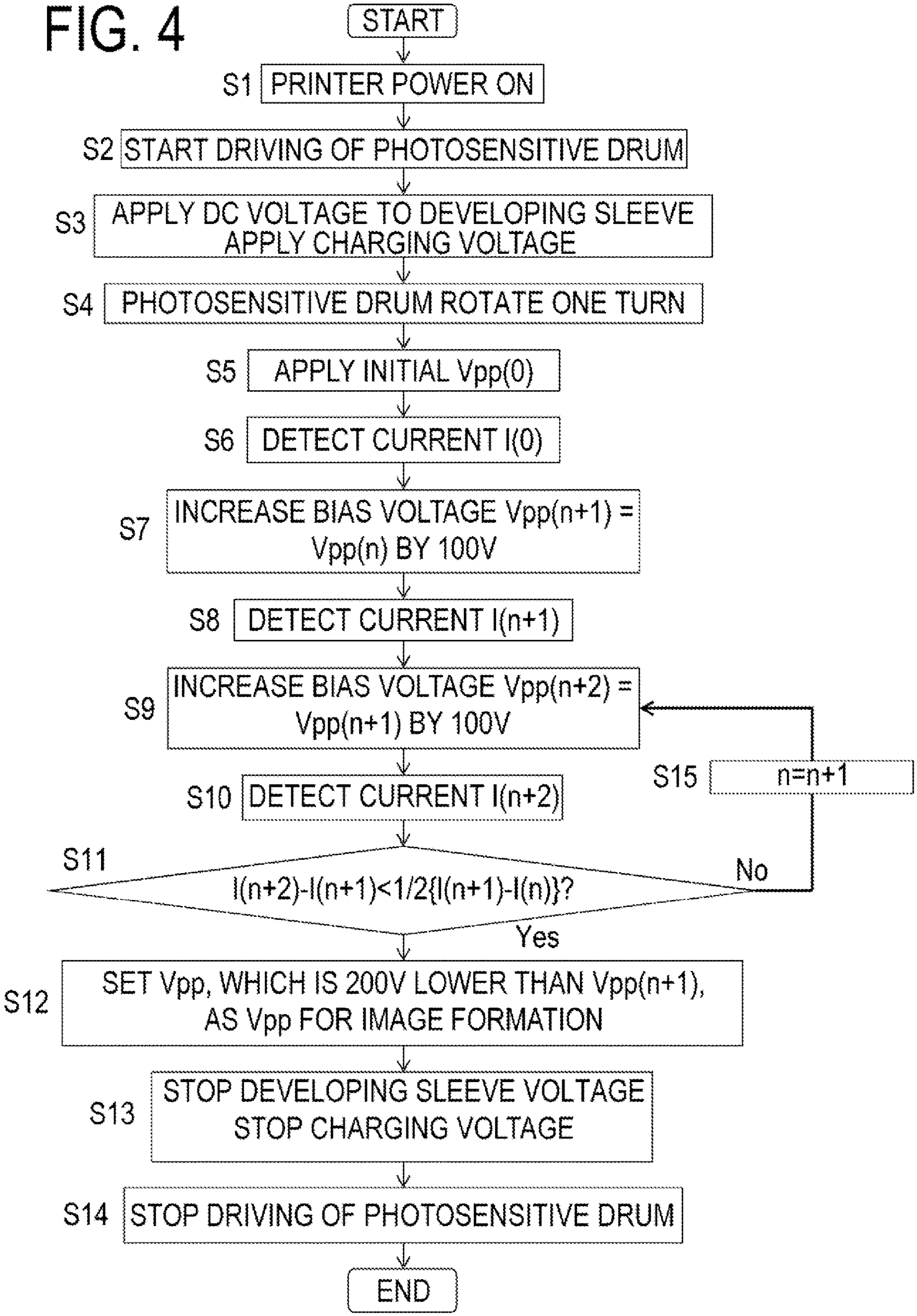
FIG. 4 is a flow chart of Example 1.

FIG. 4 is an example of a flow chart indicating a flow of detecting a leak between the photosensitive drum and the developing sleeve. This discharge generation detecting operation is executed when the printer installation environment (e.g. atmospheric pressure, temperature, humidity) changes, or based on the paper passing history at which the SD gap (closest distance between the developing sleeve and the photosensitive drum) may change, or at a timing of replacing the developing device. This execution timing is not limited to these examples, but may be set as needed. The detecting processing in Example 1 will be described with reference to FIG. 4.

When the power of the printer main body is turned ON and the discharge generation detecting operation is started (S1), rotation of the photosensitive drum is started by a driving mechanism (not illustrated), based on the instruction from the CPU (S2). This driving of the photosensitive drum continues until the discharge generation detecting operation ends. Then a −300V DC voltage is applied to the developing sleeve, and charging voltage is applied so that the surface potential of the photosensitive drum becomes −500V (S3). When the photosensitive drum rotates one turn from the state of S3, the surface potential becomes a target value (S4). Then the Vpp to be applied to the developing sleeve is set. First the Vpp is set to Vpp(0) with which leak is not generated with certainty (S5), and in this state, current I(0) induced in the metal plate inside the toner chamber is detected (S6). Then the Vpp is set to Vpp(n+1), which is higher than Vpp(n) by 100V (S7), and current I(n+1) induced in this state is detected (S8). For example, in the case of n=0, Vpp is set to Vpp(1), which is higher than Vpp(0) by 100V, and current I(1) induced in this state is detected. By repeating these steps (S9, S10, S15), the measurement is continued until Vpp(n+1), with which the induced current becomes $\{I(n+2)-I(n+1)\}/\{I(n+1)-I(n)\}<1/2$ is established, is determined (S11). When Vpp(n+1) is determined, a value determined by subtracting 200V from Vpp(n+1) is used as the Vpp for image formation, considering cases where the temperature/humidity and the atmospheric pressure changes during paper passing (S12). Then the developing voltage and the charging voltage are turned OFF (S13), and the rotary driving of the photosensitive drum is stopped thereafter (S14). In Example 1, detection is performed in a state where only the photosensitive drum is rotary driven, and rotation of the developing sleeve is stopped, but this is merely to minimize the transfer of toner from the developing sleeve to the photosensitive drum, and detection may be performed while rotating the developing sleeve, since no function problems are generated.

By detecting the current, which is induced in the metal plate inside the toner chamber when the Vpp of the AC voltage is changed like this, whether or not a leak is generated between the photosensitive drum and the developing sleeve can be determined using a simple configuration.

In Example 1, the inclination, which is a ratio of the change of the magnitude of the AC current detected by the detecting unit, with respect to the change of the magnitude of the voltage applied by the applying unit, is acquired for a plurality of times, and it is detected that the magnitude of the voltage has become the magnitude at which a leak is generated, in the case where the inclination indicates a predetermined change. To acquire the inclination, the applying unit applies the voltage a plurality of times while changing the magnitude of the voltage each time, and acquires a plurality of AC currents induced in the conductive member by applying the voltage. In Example 1, the detecting unit detects the AC current a plurality of times, and checks whether or not a predetermined change occurred to the inclination, which is the ratio of the change of the magnitude of the AC current. Whereby whether or not a leak is generated is determined. However the present invention is not limited thereto. In other words, the current value to be a threshold to determine the generation of a leak may be stored in a storage unit (e.g. memory) in advance, so that whether or not the inclination changed can be determined by comparing with this threshold, then it is not necessary to detect the AC current for a plurality of times.

In Example 1, the magnitude of the voltage to be applied is differentiated (changed) such that the absolute value thereof is gradually changed, but the present invention is not limited thereto. For example, initially the voltage may be roughly changed so as to find a general boundary between a non-leak generation voltage which does not generate a leak and a leak generation voltage which generates a leak, then the voltage may be changed more precisely. In other words, the voltage applied by the applying unit belongs either to the non-leak region where the AC current change roughly at a predetermined reference inclination (½ in Example 1) with respect to the change of the voltage, or to the leak region where the AC current does not increase even if the voltage is increased. Therefore, for example, a first voltage, of which magnitude likely belongs to the non-leak region (first region) is initially applied, then a second voltage of which magnitude likely belongs to the leak region (second region) is applied. Then a third voltage of which magnitude is larger than the first voltage but smaller than the second voltage is applied, and if the third voltage is a voltage of which magnitude belongs to the first region, then a fourth voltage of which magnitude is larger than the third voltage but smaller than the second voltage is applied. In this way, the voltage may be applied such that the differences of the absolute values of the voltages to be applied is gradually decreased. Thereby the developing voltage at image formation can be set based on a voltage which is closer to the leak generation boundary voltage.

"Leak" here refers to a phenomena where the AC voltage cannot maintain a predetermined normal rectangular wave-shaped voltage waveform, and causes image density non-uniformity, as mentioned above. Such fine leaks which do not negatively influence the image forming operation is not considered in the present invention.

The magnitude of the voltage is a magnitude of the absolute value, and in the case of the image forming apparatus that uses toner of which charging polarity has negative polarity, for example, a configuration to apply negative polarity voltage as the developing voltage or the like is used.

Example 2

In Example 1, the AC voltage applied to the developing sleeve is gradually changed, and the leak between the photosensitive drum and the developing sleeve is detected by detecting the current induced in the metal plate at that time. In Example 2 of the present invention, the detection is performed before pulling off the toner seal attached to a new process cartridge, so as to shorten the detection time. The basic configuration is the same as Example 1, but in Example 2, the metal plate is disposed inside the developing chamber, and detection is performed in a state where the developing chamber and the toner storage chamber are separated by the toner seal.

Method for Detecting Leak Between Photosensitive Drum and Developing Sleeve of Example 2

Figure 5:
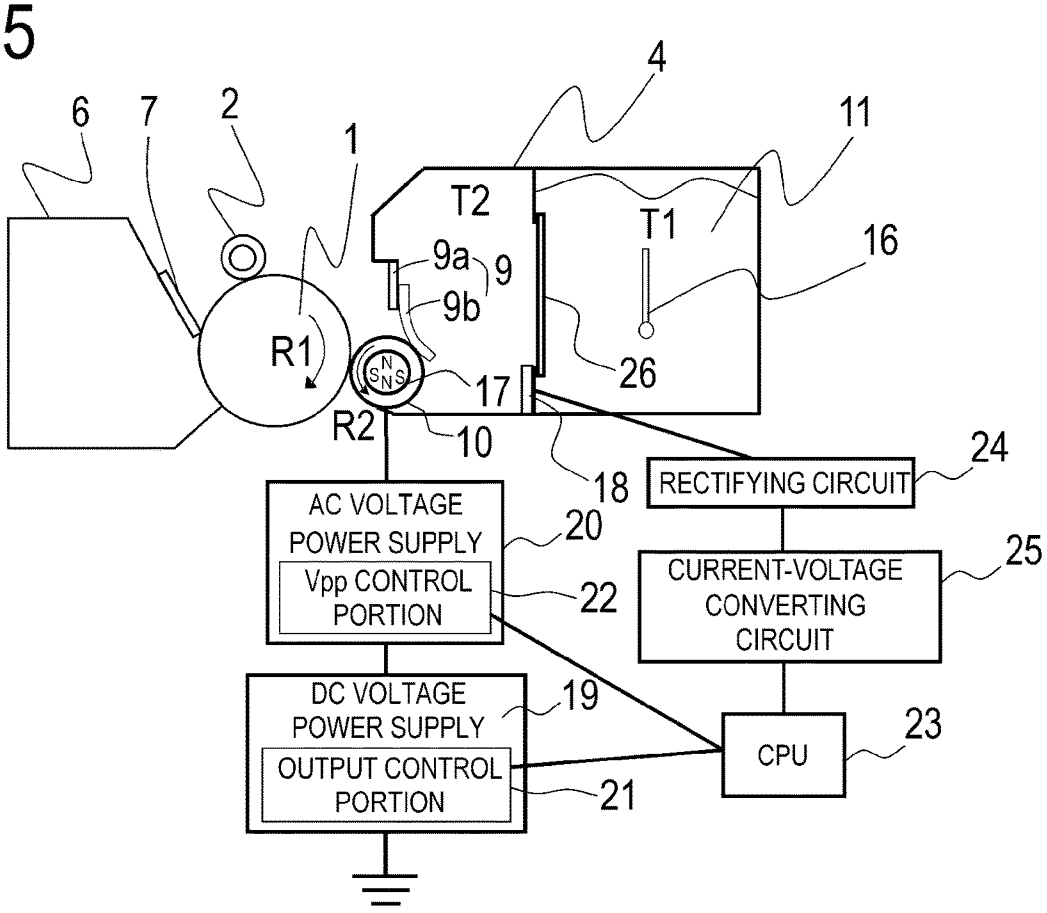
FIG. 5 is a diagram indicating a connection between a process cartridge and a main unit according to Example 2.

FIG. 5 is a diagram depicting a connection between the process cartridge and the main body according to Example 2. Differences from Example 1 are that the metal plate is disposed in the developing chamber, and that the opening connecting the developing chamber and the toner chamber is separated by a toner seal 26, which is a seal member.

If the process cartridge is new in this configuration, a leak can be detected in a state where toner does not exist between the developing sleeve and the metal plate, which means that there is no need for concern with a change of the dielectric constant between the developing sleeve and the metal plate, which is caused by the change of the toner amount. In other words, the current that is induced in the metal plate by applying the developing Vpp depends on: the developing sleeve diameter and the size of the metal plate; the distance between the developing sleeve and the metal plate; and the dielectric constant of the air between the developing sleeve and the metal plate. The dielectric constant of the air is not changed very much by the environment or atmospheric pressure, hence the inclination a of the current that is induced in the metal plate with respect to the developing Vpp can be determined mostly by the configuration of the cartridge. Therefore the inclination a of the current that is induced in the metal plate with respect to the developing Vpp is stored in advance, in a memory tag or the like, which is a storage unit attached to the cartridge. Then the developing Vpp, when the developing leak is generated, can be determined simply by the result of applying two different developing Vpps, and detecting the current values induced in the metal plate thereby.

Figure 6:
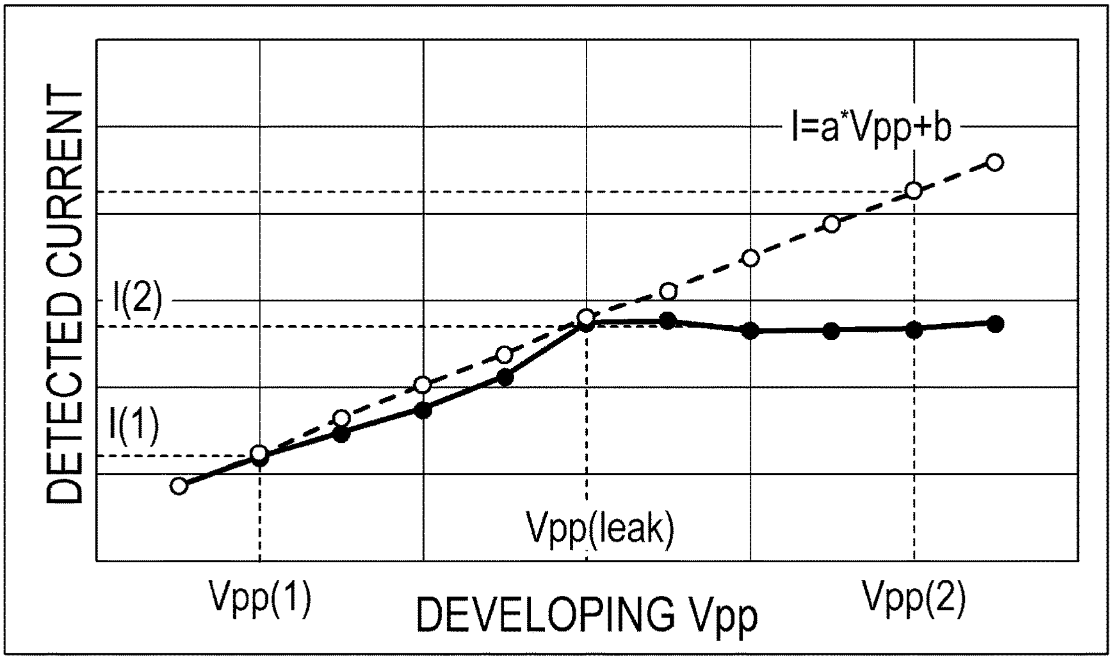
FIG. 6 is a relationship diagram between Vpp of the AC voltage applied to a developing sleeve and a current value induced in an electrode according to Example 2.

FIG. 6 indicates a relationship between the developing Vpp and the detected current. The graph plotted with the white dots indicates a relationship between the developing Vpp and the detected current under the condition where a developing leak is not generated (e.g. condition where an SD gap is sufficiently wide), and here the developing Vpp and the detected current are proportionate to each other, even if the developing Vpp becomes high. The inclination a thereof depends on: the developing sleeve diameter and the size of the metal plate; the distance between the developing sleeve and the metal plate; and the dielectric constant of the air between the developing sleeve and the metal plate. The graph plotted with the black dots, on the other hand, indicates a case where the developing Vpp is changed in the same manner, with the SD gap 200 μm, as indicated in Example 1, and here the detected current becomes a constant after the timing when the developing leak is generated. This is because the AC voltage can no longer maintain a normal voltage waveform, and the development waveform no longer changes even if the Vpp is increased thereafter, as described in Example 1.

Figure 7:
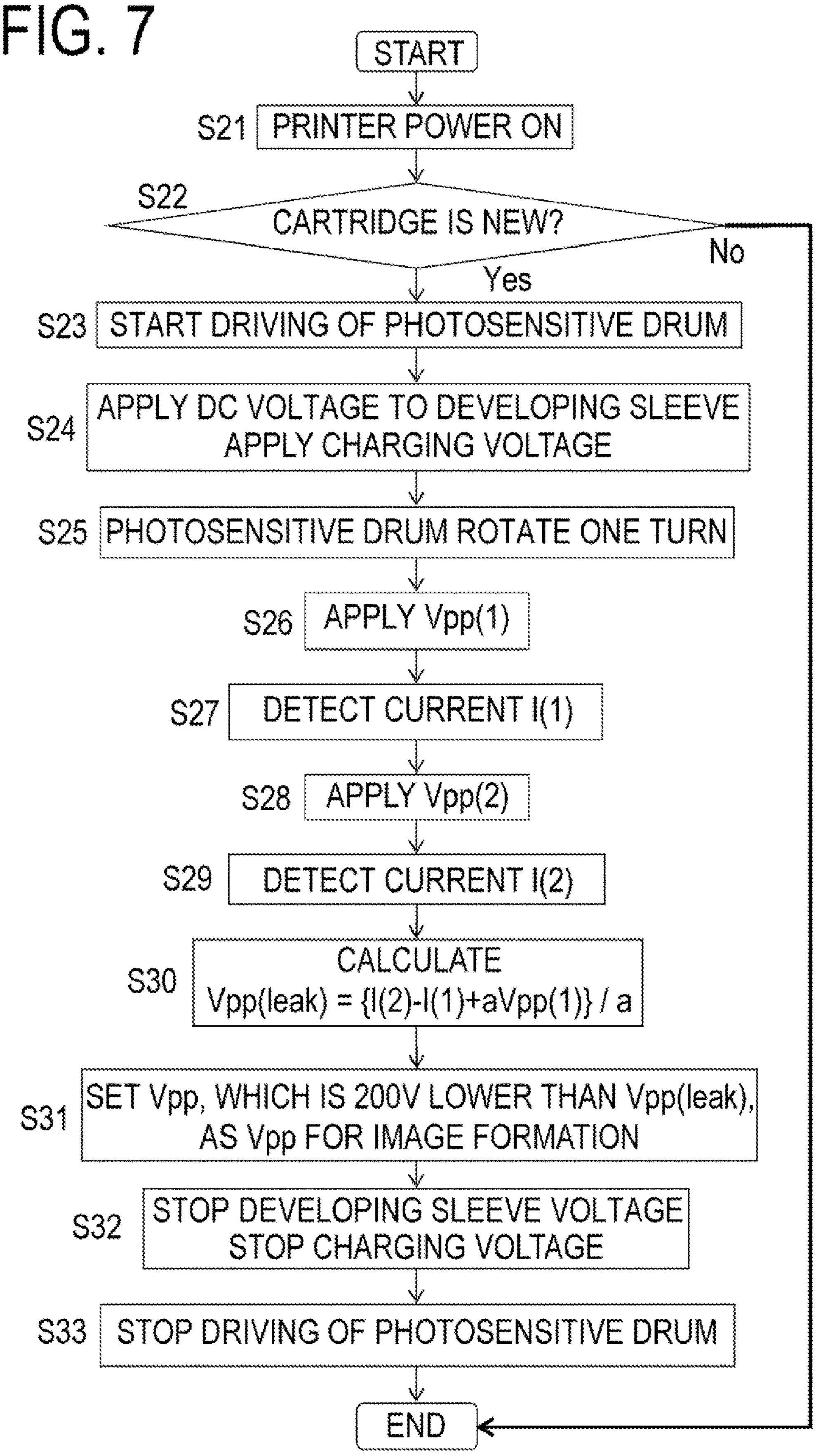
FIG. 7 is a flow chart of Example 2.

The detecting processing of Example 2 will be described with reference to the flow chart in FIG. 7. First the power of the printer main body is turned ON (S21), and it is determined whether or not the process cartridge is new using the data of a memory tag, or the like (S22). The operation ends if the process cartridge is not new. If it is determined that the process cartridge is new, on the other hand, driving of the photosensitive drum is started (S23). This driving of the photosensitive drum continues until the discharge generation detection operation ends. Then a −300V DC voltage is applied to the developing sleeve, and charging voltage is applied so that the surface potential of the photosensitive drum becomes −500V (S24). When the photosensitive drum rotates one turn from the state of S24, the surface potential becomes a target value (S25). Then Vpp(1), with which leak is not generated with certainty, is applied (S26), and the current I(1) that is induced in the metal plate inside the toner chamber at this time is detected (S27). Then a maximum Vpp(2) that can be outputted is applied (S28), and current I(2) that is induced at this time is detected (S29). Based on the detected results, $Vpp(leak)=\{I(2)-I(1)+aVpp(1)\}/a$ is determined (S30). When Vpp(leak) is determined, a value determined by subtracting 200V from Vpp(leak) is used as the Vpp for image formation, considering cases where the temperature/humidity or the atmospheric pressure changes during paper passing (S31). Then the developing voltage and the charging voltage are turned OFF (S32), and the rotary driving of the photosensitive drum is stopped thereafter (S33).

As described above, in the state where the developing chamber and the toner storage chamber are separated by the toner seal, and toner does not exist between the developing sleeve and the metal plate, the developing Vpp with which the leak is generated can be determined simply by changing the developing Vpp in two steps, and measuring the current induced in the metal plate in each step. As a result an appropriate Vpp can be set in a shorter time.

In Example 2, (i) the inclination, which is the ratio of the change of the magnitude of the AC current with respect to the change of the magnitude of the voltage, is set in advance, hence the reference to plot the change of the voltage/AC current in the graph is determined in accordance with the inclination (reference inclination). In other words, (ii) voltage having a first magnitude which belongs to the non-leak region is applied, and AC current having the first magnitude acquired thereby is determined, and (iii) voltage having a second magnitude which belongs to the leak region is applied, and AC current having the second magnitude acquired thereby is determined. Using the applied voltage and AC current acquired thereby in (ii), the straight line indicating the change of the voltage/AC current in accordance with the reference inclination in (i) can be determined, as indicated in FIG. 6. Then using the AC current acquired by the applied voltage in (iii), the leak generation boundary voltage, which is the voltage at the boundary between the non-leak region and the leak region, can be acquired.

Example 3

In Example 1, a leak between the photosensitive drum and the developing sleeve is detected by detecting current that is induced in the metal plate in accordance with the AC voltage applied to the developing sleeve. Example 3 of the present invention provides means for sensing whether or not a drum cartridge having the photosensitive drum and a developing cartridge having the developing sleeve, are attached to the image forming apparatus, by detecting the current induced in the metal plate.

Configuration of Example 3 is essentially the same as Example 1, but a difference is that the process cartridge is separated into: the drum cartridge having the photosensitive drum (first cartridge); and the developing cartridge having the developing sleeve (second cartridge). In some conventional process cartridges in which the photosensitive drum and the developing sleeve are integrated, whether the process cartridge is attached to the main body is determined depending on whether current is induced in the metal plate when a specific developing voltage is applied.

However if this method is used for Example 3, attachment of the developing cartridge can be determined, but attachment of the drum cartridge cannot be determined. Therefore in Example 3, developing Vpp, with which the leak is generated with certainty, is applied, and current induced in the metal plate at this time is detected, whereby whether or not the drum cartridge is attached is determined.

<Method for Determining Whether or not Drum Cartridge is Attached>

In Example 3, whether or not the drum cartridge is attached is determined by detecting the current induced in the metal plate when two different developing Vpps are applied. Specifically, a developing Vpp, with which the developing leak is not generated with certainty, and a developing Vpp, with which the developing leak is generated with certainty are applied respectively, and current induced in the metal plate in each case is detected.

Figure 8:
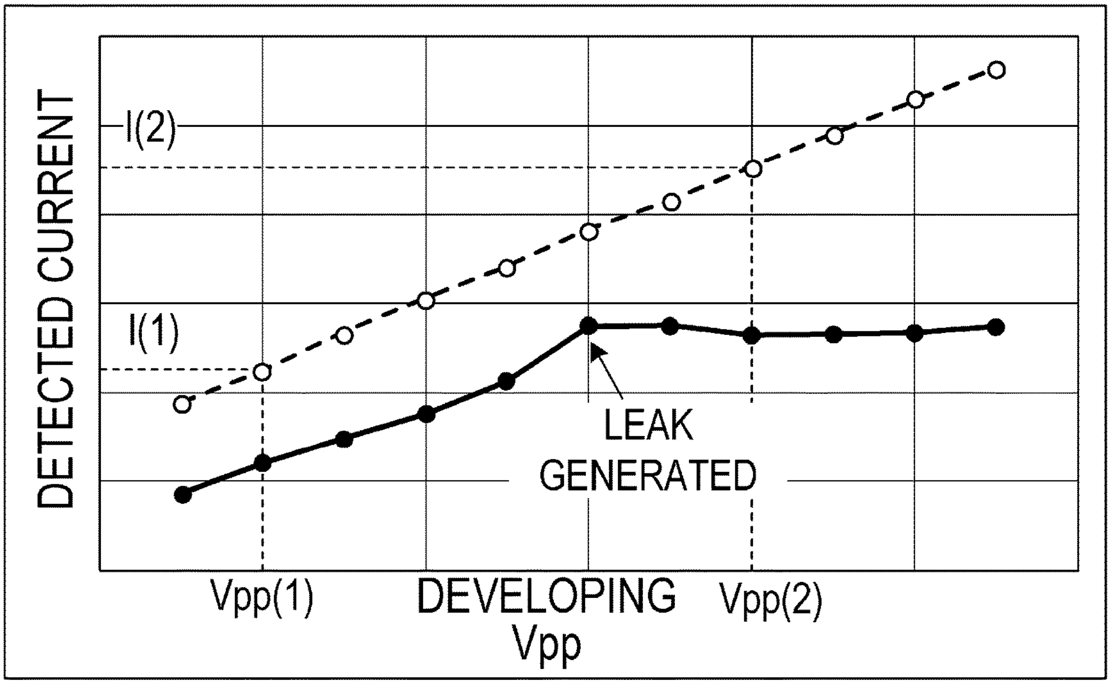
FIG. 8 is a relationship diagram between the Vpp of the AC voltage applied to a developing sleeve with/without a drum cartridge and a current value induced in an electrode.

FIG. 8 is the result when the current induced in the metal plate was measured while changing the developing Vpp in the case where the drum cartridge is attached (solid line), and in the case where the drum cartridge is not attached (dotted line) respectively. The absolute values of the induced current are different depending on whether or not the drum cartridge is attached, because the absolute value of the current changed by the floating capacitance adjacent to the developing sleeve and toner amount inside the developing apparatus. As described in Example 1, in the case where the drum cartridge is attached (solid line), the current no longer changes when the developing Vpp exceeds a certain value, due to the influence of the developing leak. In the case where the drum cartridge is not attached, on the other hand, the current value increases in proportion to the developing Vpp. This is because a leak is not generated even if the developing Vpp is increased, since there is not photosensitive drum that faces the developing sleeve.

In other words, in the case of performing detection in a state where the drum cartridge is not attached (in a state where the photosensitive drum does not exist), a leak is not generated even if a high developing Vpp is applied, therefore induced current in proportion to the developing Vpp flows. On the other hand, in the case of performing the same detection in a state where the drum cartridge is attached (in a state where the photosensitive drum exists), the value of the induced current becomes small, when the developing Vpp, with which the leak is generated with certainty, is applied, compared with the above case of no leak generated. By using this difference, whether or not the drum cartridge is attached can be determined.

<Description of Method for Determining Attachment of Cartridges>

Figure 9:
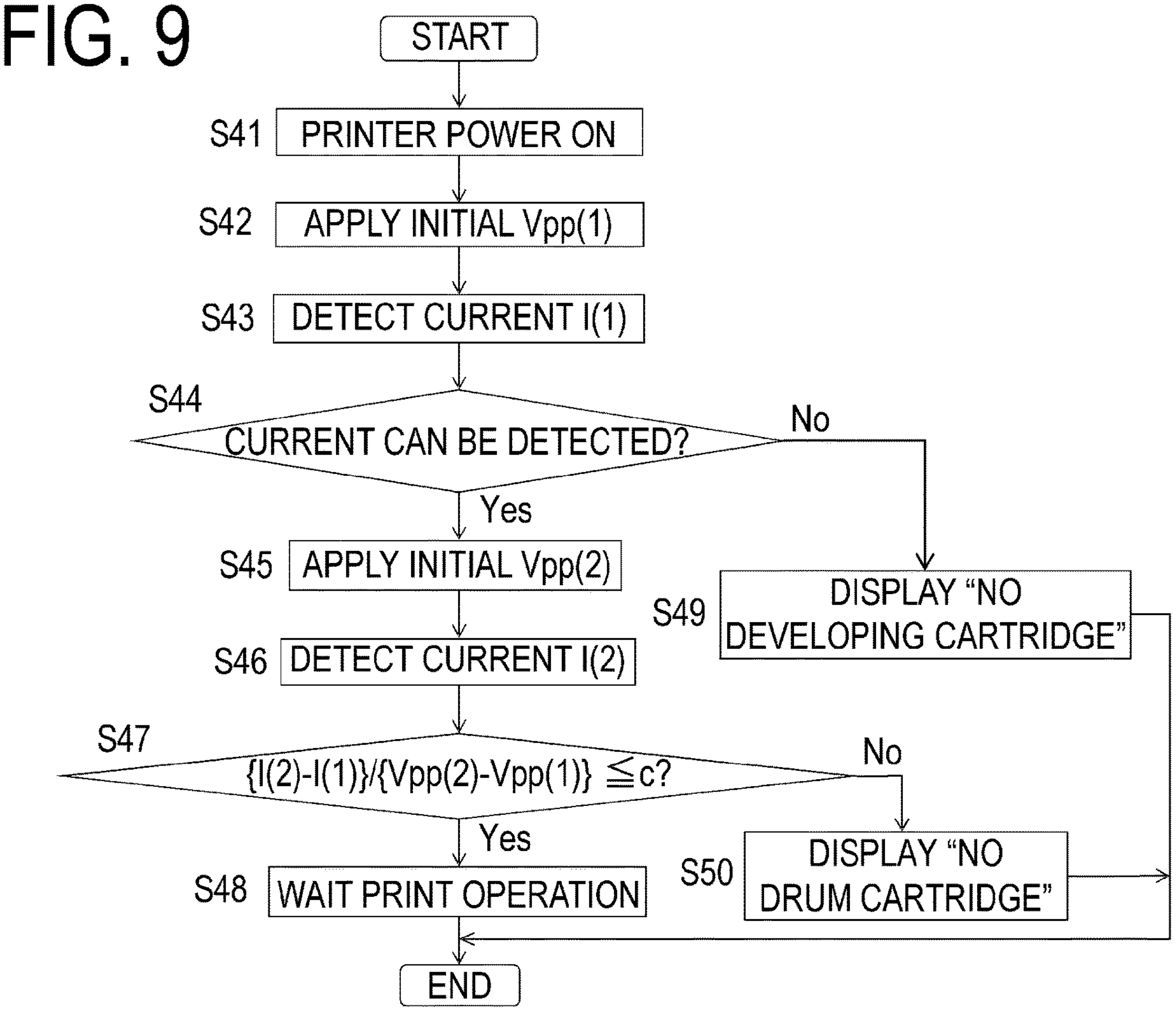
FIG. 9 is a flow chart of Example 3.

FIG. 9 is an example of a flow chart to determine attachment of the cartridges in Example 3. The detecting processing of Example 3 will be described with reference to FIG. 9. First when the power of the printer main body is turned ON, or in a state where the power of the printer main body is already ON, a front door of the main body is closed (S41). Then the developing Vpp(1), with which a leak is not generated with certainty, is applied (S42). The current value I(1) that flows at this time is detected (S43). It is determined whether or not current is detected (S44), and if current does not flow (No), it is notified that the developing cartridge is not attached (S49). If current flows, the developing Vpp(2), with which a leak is generated with certainty, is further applied (S45), and the current value I(2) detected at this time is measured (S46). Here it is determined whether $\{I(2)-I(1)\}/\{Vpp(2)-Vpp(1)\}$ is smaller than a threshold c (S47). If larger than the threshold c (No), a leak is not generated, hence it is notified that the drum cartridge is not attached (S50). If the detected value is the threshold c or less, a leak is generated, hence it is determined that the developing cartridge and the drum cartridge are correctly attached, and the predetermined print preparation operation is performed (S48).

By applying the developing Vpp to the developing sleeve and detecting the current induced in the metal plate disposed inside the developing apparatus in this way, the presence of the developing apparatus and the presence of the cleaning apparatus can be determined simultaneously.

Each configuration of Examples 1 to 3 may be combined within the scope that does not generate a technical inconsistency.

The present disclosure is not limited to the above embodiments, but may be changed and modified in various ways without departing from the spirit and scope of the present disclosure. Therefore the following claims are attached to make the scope of the present disclosure public.

As described above, the present invention is capable of detecting a leak between the image bearing member and the developer carrying member using an inexpensive and simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus that is capable of executing an image forming operation, comprising:

an image bearing member;

a developer carrying member that faces the image bearing member in a state of keeping a predetermined gap therefrom, and develops a latent image formed on the image bearing member using developer;

a frame that supports the developer carrying member;

an applying unit that applies developing voltage, in which DC voltage and AC voltage are superimposed, to the developer carrying member;

a conductive member that is disposed in the frame;

a detecting unit that detects AC current induced in the conductive member by the applying unit applying the developing voltage to the developer carrying member; and a control portion that controls the applying unit, wherein the control portion controls the developing voltage in the image forming operation, based on the AC current which the detecting unit detects in a case where the developing voltage is applied by the applying unit.

2. The image forming apparatus according to claim 1, wherein the detecting unit detects the AC current in a case where the applying unit applies the developing voltage for a plurality of times at a different magnitude each time.

3. The image forming apparatus according to claim 1, wherein the control portion further includes acquiring unit that acquires the developing voltage to be applied to the developer carrying member in the image forming operation.

4. The image forming apparatus according to claim 3, wherein the acquiring unit acquires for a plurality of times an inclination of the change of the magnitude of the AC current, detected by the detecting unit, with respect to the change of the magnitude of the developing voltage, caused by the applying unit applying the developing voltage for a plurality of times at a different magnitude each time, acquires a leak generation voltage, which is the developing voltage in a case where the magnitude of the inclination becomes smaller than a predetermined magnitude, and acquires, as the developing voltage, the developing voltage that is smaller than the leak generation voltage by a predetermined magnitude.

5. The image forming apparatus according to claim 4, wherein the leak generation voltage is a voltage with which the AC current detected by the detecting unit does not increase even if the developing voltage applied by the applying unit is increased.

6. The image forming apparatus according to claim 3, wherein based on:

(i) a reference inclination that is predetermined as an inclination of the change of the magnitude of the AC current with respect to the change of the magnitude of the developing voltage;

(ii) the AC current having a first magnitude which the detecting unit detects in a case where the applying unit applies the developing voltage having the first magnitude; and (iii) the AC current having a second magnitude which the detecting unit detects in a case where the applying unit applies the developing voltage having the second magnitude of which absolute value is larger than the first magnitude, the acquiring unit acquires a leak generation boundary voltage which is a boundary at which the magnitude of the inclination changes to the inclination that is smaller than the magnitude of the reference inclination by a predetermined magnitude, and the acquiring unit acquires, as the developing voltage, the developing voltage of which magnitude is smaller than the leak generation boundary voltage by a predetermined magnitude.

7. The image forming apparatus according to claim 6, wherein the leak generation boundary voltage is a voltage at a boundary between:

a first region where the magnitude of the AC current detected by the detecting unit changes roughly in accordance with the reference inclination, with respect to the change of the magnitude of the developing voltage applied by the applying unit; and a second region where the magnitude of the AC current detected by the detecting unit does not increase even if the magnitude of the developing voltage applied by the applying unit is increased.

8. The image forming apparatus according to claim 7, wherein the second magnitude of the developing voltage is a magnitude included in the second region.

9. The image forming apparatus according to claim 6, further comprising a storage unit that stores at least the reference inclination, wherein the developer carrying member, the frame and the storage unit are integrated as a cartridge which is attachable/detachable to/from an apparatus main body of the image forming apparatus.

10. The image forming apparatus according to claim 9, wherein the storage unit stores information on whether or not the cartridge is new.

11. The image forming apparatus according to claim 3, wherein the frame includes: a developing chamber in which the developer carrying member is disposed; a storage chamber in which developer is stored; and an opening that connects between the developing chamber and the storage chamber, and the opening is sealed by a seal member in a case where the cartridge is new, and the conductive member is the seal member.

12. The image forming apparatus according to claim 1, wherein the frame includes a storage chamber in which developer is stored, and the conductive member is disposed in the storage chamber.

13. The image forming apparatus according to claim 1, wherein the AC voltage has a rectangular wave-shaped waveform.

14. The image forming apparatus according to claim 1, further comprising:

a first cartridge that includes the image bearing member, and is attachable/detachable to/from the apparatus main body of the image forming apparatus;

a second cartridge that includes the developer carrying member and the frame, and is attachable/detachable to/from the apparatus main body of the image forming apparatus; and a sensing unit that senses, based on the AC current detected by the detecting unit, whether the first cartridge is attached to the apparatus main body, and whether the second cartridge is attached to the apparatus main body.

* * * * *